Jan. 26, 1954 T. J. LEHANE ET AL 2,667,336
TEMPERATURE AND VENTILATION CONTROL APPARATUS FOR BUSES
Filed Feb. 16, 1951 2 Sheets-Sheet 1

INVENTORS.
Timothy J. Lehane
William M. Smith
BY
Harvey M. Gillespie
Atty

Patented Jan. 26, 1954

2,667,336

UNITED STATES PATENT OFFICE 2,667,336

TEMPERATURE AND VENTILATION CONTROL APPARATUS FOR BUSES

Timothy J. Lehane, North Riverside, and William M. Smith, Glen Ellyn, Ill., assignors to Vapor Heating Corporation, Chicago, Ill., a corporation of Delaware Application February 16, 1951, Serial No. 211,324

4 Claims. (Cl. 257—3)

This invention relates generally to systems for conditioning the air of an enclosed space, and more particularly to improved means for delivering heated and/or cooled air into the enclosed space, for example a highway bus or similar vehicle.

The principal object of the invention is to provide improved means, in a system of the above character, whereby a maximum amount of fresh air may be delivered to the heating and/or cooling apparatus, the fresh air so used being determined not by the temperature of the enclosure per se, but rather by the heating and cooling load in relation to the capacity of the heating and cooling apparatus. In other words, the invention contemplates using the maximum amount of fresh air which can be heated or cooled by the heating and cooling apparatus and, at the same time, maintain a predetermined temperature within the enclosed space served by the heating and cooling apparatus.

The invention may be described briefly as comprising a combined heating and cooling apparatus, a damper for controlling the proportions of outside and inside air delivered to such apparatus, temperature responsive means for controlling the position of said damper, other temperature responsive means for controlling the effectiveness of the heating apparatus, and means for selectively adjusting the temperature responsive means, whereby functioning of the temperature responsive means for controlling the effectiveness of the heating apparatus will lag relative to the functioning of the damper control means during the cooling cycle of the system and whereby during the heating cycle, the air damper control means will lag in relation to the functioning of the control means for the heating apparatus.

The invention contemplates the use of a minimum number of control thermostats for controlling the several elements of the control system and to this end means are provided for adjusting the control thermostats so as to shift their lead and lag relationship and thereby make it practicable to utilize the same thermostats to control the damper and the heating apparatus during both the heating and cooling cycles of the system. This result is achieved by providing the thermostats with electrical heaters and by so energizing the electrical heaters that a greater amount of heat is applied to one thermostat than to the other during the heating cycle of the system and a greater amount of heat is applied to the other thermostat during the cooling cycle of the system so as to reverse their lead and lag relationship.

With the foregoing considerations in mind, it is a principal object of the invention to achieve complete conditioning of the air within an enclosed space with a minimum of control equipment.

Another object of the invention is to utilize the maximum amount of fresh air during either the cooling or the heating cycle of the system and to provide for such fresh air by means of control circuits which are common to both cooling and heating phases of the system.

Other objects and important features of the invention will become more apparent from a study of the within specification taken together with the drawings which together show a preferred embodiment of the invention and what is now considered to be the best mode of practicing the principles thereof. While the invention is described in terms of such embodiment, the terms are used as a matter of convenience and not as limitations.

Figure 1:
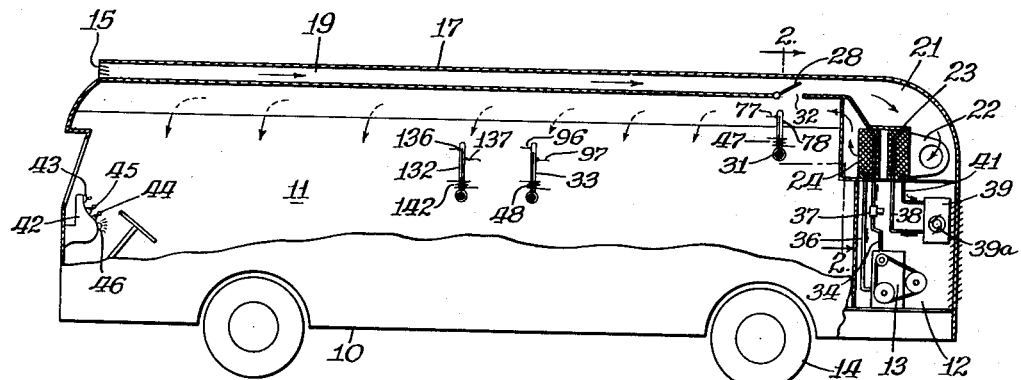
Fig. 1 is a broken away longitudinal section through a passenger bus having embodied therein the improvements according to the present invention.
Figure 2:
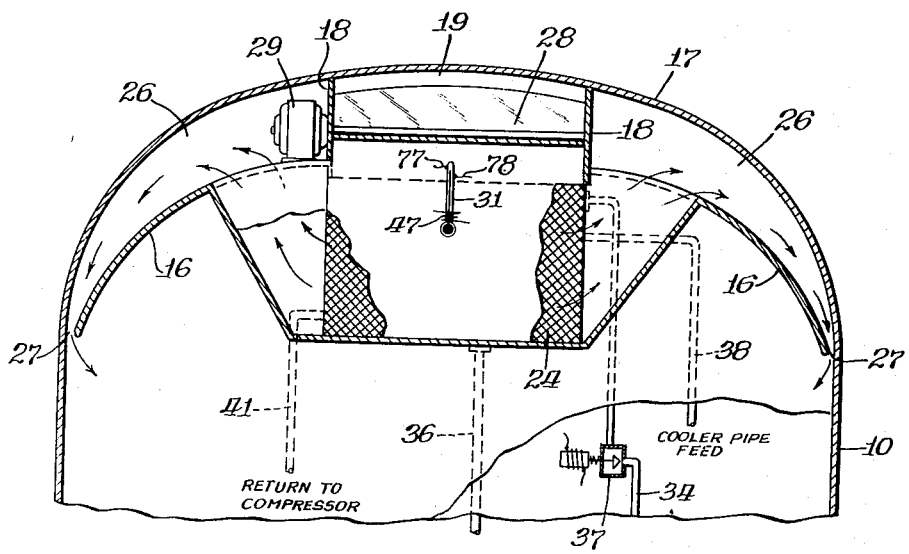
Fig. 2 is a transverse vertical section taken along the line 2—2 of Fig. 1, showing the arrangement of the ducts and the apparatus for supplying conditioned air to the interior of the vehicle shown in Fig. 1.

Referring now particularly to Figs. 1 and 2 of the drawings, there is shown a passenger bus 10 having a passenger compartment 11. The bus 10 may be of the rear engine type having an engine compartment 12 for an internal combustion engine 13 supplying power to the rear wheels 14 of the bus. A curved false ceiling 16 underlies the curved top 17 of the bus, and a pair of duct walls 18 extend lengthwise of the bus on either side of the center thereof. These walls together with the ceiling 16 and the top 17 define a fresh air duct 19 extending from a front grating 15 to a blower compartment 21 disposed above the engine compartment 12. A blower 22 is disposed within the blower compartment 21 and forces the air entering the compartment from duct 19 through an air cooler 23 and an air heater 24. The said air cooler 23 and air heater 24 are supplied, respectively, with coolant and heating fluid under the conditions which will be hereinafter described. The air forced through the elements 23 and 24 by the blower 22 is directed into ducts 26 on each side of the fresh air duct 19. Each of the ducts 26 is defined by the top 17 of the bus and the false ceiling 16 thereof and one of the duct walls 18. A top 17 and the curved false ceiling 16 converge toward each other, so that a longitudinally extending duct opening 27 is provided at each side of the bus 10 to distribute the heated and cooled air delivered into the passenger compartment 11.

The fresh air duct 19 is provided with a damper 28 which is operated by a reversible motor 29, the motor being controlled by a damper thermostat 31 and the damper control relay A and the cooling cycle relay B. The said damper 28 is so constructed that when it is moved to one extreme position it closes the fresh air duct 19 to prevent admission of fresh air into the blower chamber and also opens a recirculation port 32, whereby air is withdrawn from the interior of the bus into the blower chamber and caused to be recirculated through the cooling and heating elements 23 and 24. When the damper 28 is moved to its other extreme position it closes the recirculation port 32 and opens the fresh air duct 19 so that the maximum amount of fresh air is forced through the elements 23 and 24 and into the passenger space 11 of the bus.

A thermostat 33 and its associated relay C control a heat valve 37 and thereby control the admission of heating fluid to the air heater 24, there being a supply line 34 for heating fluid which extends from the engine jacket of the engine 13 to the air heater 24. A return line 36 from the air heater 24 is connected into the coolant jacket of the said engine 13.

A suitable coolant is supplied to the air cooler 23 by means of a supply line 38 leading from a cooling mechanism 39. The cooling mechanism 39 is shown herein as being driven by an electric motor 39a, but it will be obvious that said cooling mechanism may be operated by a power take-off from the engine 13. In that event, the element 39a may be regarded as electrical clutch element for connecting the cooling mechanism with the engine 13. A return line 41 connects the air cooler 23 to the intake side of the cooling mechanism 39.

The cooling and heating apparatus are controlled by means of switches located on a switch panel 42; the panel being disposed in a position readily accessible to the driver of the vehicle 10. The control panel 42 includes a main switch 43, a cooling switch 44, a light switch 45, and a signal lamp 46.

The main switch 43 controls the operation of the blower 22 and cooperates with the thermostats 31 and 33 to energize the damper control relay A and the heat valve relay C, respectively, and also cooperates with the cooling cycle relay B for controlling the functional settings of thermostats 31 and 32. The cooling switch 44 controls the energization of the cooling mechanism 39 and also controls the energization of the cooling cycle relay B.

Control circuits

Figure 3:
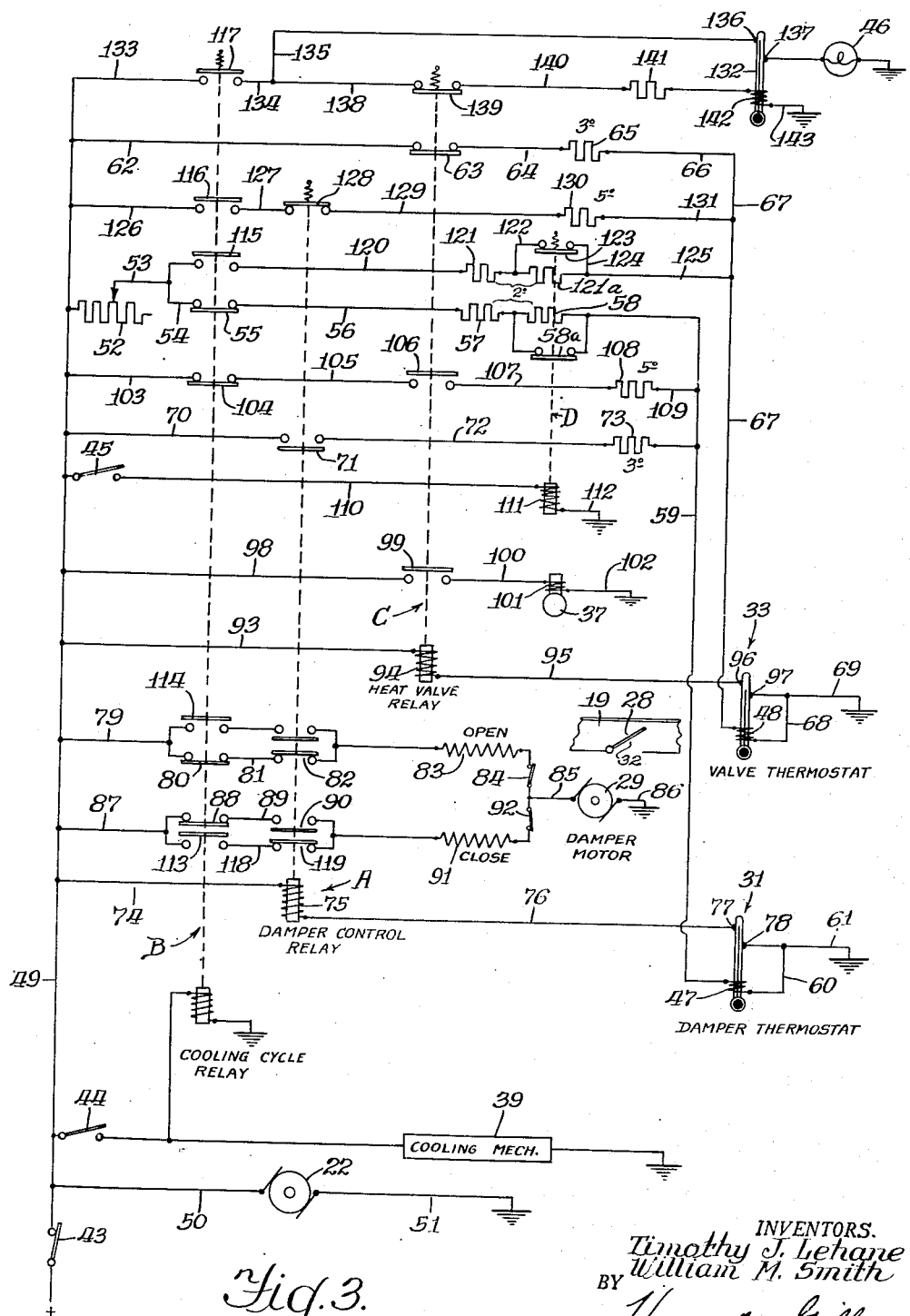
Fig. 3 is a circuit diagram showing the several control elements and the control circuits for controlling the operations of the system.

The circuit diagram in Fig. 3 shows the damper control thermostat 31 closed and heat valve control thermostat 33 open at their upper contacts. It is to be assumed, therefore, that the ambient temperature within the bus is such as to require the delivery of heat into the passenger space 11. In this connection it will be observed that the damper 28 is shown in an intermediate position. Consequently proportionate amounts of fresh and recirculated air, from the duct 19 and recirculation port 32 respectively, are being delivered into the blower chamber 21. It will be also observed that the main switch 43 is closed. Consequently, all of the electrical elements shown in the said circuit diagram are illustrated in the positions which they assume when the said main switch 43 is closed during the heating cycle of the system and the temperature is such that the damper thermostat 31 is satisfied, but the heat valve thermostat 33 remains unsatisfied.

Both thermostats 31 and 33 are of the mercury column type and are constructed to function at the same temperature, for example 78°, but this normal temperature setting is lowered from time to time by applying auxiliary heat to the thermostat. To this end the thermostat 31 is provided with an electrical heater 47 and the thermostat 33 is provided with an electrical heater 48.

The closing of said main switch energizes the blower motor 22; the circuit including the main supply 49, lead 50, motor 22 and lead 51 to the ground. The blower, therefore, operates continuously so long as the main switch 43 remains closed regardless of whether the system is controlling the heating or the cooling of the space 11 of the bus. During the heating cycle of operation, as depicted in Fig. 3, the cooling cycle relay B is deenergized. Under such condition an energizing circuit is directed through the auxiliary heater 47 to add approximately 2° of auxiliary heat thereto and thereby lower the temperature setting of the damper control thermostat 31 from its normal setting of 78° to an adjusted setting of 76°. The circuit for adding the 2° of heat to said thermostat leads from the main supply line 49 through a variable resistor 52, branch leads 53, 54, deenergized closed contact 55 of cooling cycle relay B, lead 56, series connected resistors 57, 58, lead 59. The series connected resistors, as above indicated, have a heat value of approximately 2° on the heater 47, when the variable resistor 52 is adjusted to the position shown. However, this heat value of resistors 57, 58 can be increased or reduced by adjustment of the variable resistor 52.

The heater 48 of the valve thermostat 33, because of the deenergized position of valve control relay C, is energized by a circuit leading from the main supply line 49 through lead 62, deenergized closed contact 63 of valve control relay C, lead 64, metered resistor 65, leads 66, 67, heater 48 and leads 68 and 69 to the ground. The resistor has a value of 3° of heat to the auxiliary 48. This heating circuit is effective only when the thermostat 33 is open at its contacts and consequently effects cycling of the thermostat 33 and relay C when the temperature of the passenger space 11 of the bus is within 3° of the normal setting (78°) of the thermostat 33. This circuit will be again referred to in connection with the cycling operation of the thermostat 33 and relay C.

Referring again to the heating circuit of thermostat 31. A 3° heating circuit, similar to the last one above described, is closed through heater 47 of damper thermostat 31 when the relay A is deenergized. This circuit leads from main supply line 49 through lead 70, deenergized closed contact 71, lead 72, 3° metered resistor 73, and thence through lead 59 to heater 47, and leads 60 and 61 to the ground. This heating circuit has been broken by the closing of damper thermostat 31 and consequent energization of damper relay A. It is to be assumed, therefore, that the damper thermostat, at the present moment is cooling as an incident to the energization of the relay A and the consequent opening, at relay contact 71, of the last described heating circuit.

The energizing circuit for said relay A leads from supply line 49 through lead 74, relay winding 75, lead 76 through upper and lower contacts 77, 78 of thermostat 31 and thence through lead 61 to the ground. The energization of relay A, during the heating cycle of the system, closes an energizing circuit through the damper motor 29 to impart movement to the damper in a direction to increase the delivery of fresh air from duct 19 and to proportionately reduce the amount of recirculated air drawn from the interior of the bus through port 32. This motor energizing circuit leads from supply line 49 through lead 79, deenergized closed contact 80 of cooling cycle relay B, lead 81, energized contact 82 of damper relay A, motor field winding 83, motor limit switch 84, lead 85, motor armature 29 and lead 86 to the ground. The operations of the motor 29 and the damper 28 are only momentary, since a motor reversing circuit is set up through the deenergized relay A when its energizing circuit is broken at thermostat contact 77 by the cooling of thermostat 31. The said reversing circuit includes the main supply line 49, lead 87, deenergized closed contact 88 of cooling cycle relay B, lead 89, deenergized closed contact 90 of damper relay A, motor field 91, limit switch 92 and thence through lead 85, motor armature 29 and lead 86 to the ground.

From the above description, it will be observed that the thermostat 31 will cycle off the contact 71 of the heat control damper relay A, when the temperature of the space 11 of the bus stands at or within 3° of the adjusted temperature setting (76°) of said thermostat 31 and that, as a result of the cycling action, the damper 28 will be moved short distances back and forth each time the thermostat 31 closes and opens its upper contact 77. Said thermostat 31 will lag slightly in the breaking of its upper contact 77, as the temperature of the bus nears the adjusted setting (76°) of the thermostat. However, when the temperature of the bus reaches 75°, the valve thermostat 33, being adjusted to close at that temperature, will function to energize the heat valve relay C and thereby closes the heat valve 37, closes another heating circuit for applying 5° of auxiliary heat to the thermostat so as to increase its lag during its opening movement and thereby so increase the momentary duration of the closed periods of thermostat 31 until the damper 28 assumes a position which fully opens the fresh air duct 19 and fully closes the recirculation port 32. At this time, the limit switch 84 of the motor will be opened by the movement of motor 29. Consequently the valve 28 will remain in its fully open position while the thermostat 33 continues to cycle and thereby momentarily open and close the heat valve 37.

The circuit for energizing the heat valve relay includes the main supply line 49, lead 93, solenoid 94 of relay C, lead 95, closed contacts 96, 97 of thermostat 33 and thence through lead 69 to the ground. The circuit for energizing the valve 37 closed leads from the main line 49 through wire 98, closed contact 99 of relay C, lead 100, valve solenoid 101, and thence through lead 102 to the ground. The 5° heating circuit for increasing the opening lag of damper thermostat 31 includes main supply line 49, lead 103, deenergized closed contact 104 of cooling cycle relay B, lead 105, energized closed contact 106 of valve relay C, lead 107, 5° cycle resistor 108, leads 109 and 59 to heater 47 and thence through leads 60, 61 to the ground.

*Additional heat—damper adjustment*

If additional heat should be required to maintain the bus at a desirable comfort temperature, for example during the night or at other times, when the functional settings of thermostats 31 and 33 will not suffice, additional heat may be obtained by closing switch 45 to energize relay D. This energizing circuit leads from the supply line 49 through switch 45, lead 110, solenoid 111 of relay D and 112 to the ground. The energization of relay D moves its contact 58a to open position and thereby puts the resistor 58 in series with the resistors 57 and 52 so as to materially reduce the volume of heating current to the auxiliary heater 47 of damper thermostat. Whereupon, the cooling of thermostat 31 results in causing it to break contact and thereby deenergize the relay A and thereby energize motor 29 in a direction to open the recirculation port 32 to permit air to be withdrawn from the bus and recirculated through the heater 24.

While the above damper thermostat adjustment is described in connection with a situation in which the damper is in a position to close the recirculating port 32, such adjustment, it will be observed, can be made at any time regardless of the position of the damper 28.

*Cooling*

The control circuits shown in Fig. 3 have been described thus far in connection with the heating phases of the system. For the purpose of describing the cooling phases of the system, let it be now assumed that the valve thermostat 33 is closed to energize the valve relay C and thereby close contacts 99 and 106 of relay C and open its contact 63, the control elements being otherwise in the positions shown in said Fig. 3. Under the present assumed conditions, the closing of switch 44 sets the cooling mechanism 39 into operation so as to supply a coolant to the air cooling device 23. The closing of said switch 44 also energizes cooling cycle relay B so as to open its contacts 88, 80, 104 and 55, and simultaneously close its contacts 113, 114, 115, 116 and 117. Under the condition now assumed, the damper 28 is sufficiently opened and, consequently, the motor limit switch 84 would be open. The closing of contact 113 of relay B, therefore, closes a motor energizing circuit to operate the damper 28 in a direction to close the fresh air conduit 19 and partially open the recirculating duct 32. This motor energizing circuit includes the main supply line 49, lead 87, energized closed contact 113 of relay B, lead 118, energized closed contact 119 of relay A, field 91, limit switch 92, lead 85, motor armature 29 and lead 86 to the ground. The energized open contact 104 of relay B breaks the 5° heater circuit through thermostat heater 47. Also, the opening of contact 55 of relay B removes the additional heat from the auxiliary heater 47. It will, therefore, be seen that all heat is now removed from the damper thermostat 31 and a 2° heating circuit is closed through auxiliary heater 48 of thermostat 33 so as to lower its functional setting to 76°. This circuit includes main supply line 49, variable resistor 52, lead 53 through energized closed contact 115 of relay B, lead 120, 2° metered resistor 121, lead 122, deenergized closed contact 123 of relay D, leads 124 and 125 to lead 67 and thence through the auxiliary heater 48 and leads 68 and 69 to the ground. The closing of said contact 116 closes an electrical circuit for applying an additional 5° of heat to thermostat 33 so that the opening of this thermostat at its upper contact 96 will lag in relation to the opening of contact 77 of thermostat 31. The last mentioned heating circuit includes the main line 49, lead 126, energized closed contact 116 of relay B, lead 127, energized closed contact 128 of relay A, lead 129, 5° cycle resistor 130 and lead 131 to the lead 67 and thence through the auxiliary heater 48 and leads 68 and 69 to the ground.

When the temperature of the bus is cooled sufficiently to open contact 77 of thermostat 31 the damper relay A will be deenergized and thereby close a momentary circuit through the motor 29 to operate the damper 28 in a direction to open the fresh air duct 18 so as to increase the delivery of fresh air to the blower chamber 21. The deenergization of the said relay A closes the contact 71 thereof so as to energize the heating circuit through cycle resistor 73 to the thermostat heater 47. This circuit, as previously described, includes the main supply line 49, lead 70, deenergized closed contact 71 of relay A, lead 72, cycle resistor 73 to lead 59 and thence through the auxiliary heater 47 and leads 60 and 61 to the ground. The deenergization of damper relay A also removes the 5° of heat from the valve thermostat 31 by opening of the contact 128 of relay A. It will be seen, therefore, that the thermostat 31 will cycle off the contact 71 of relay A through a range of 3° and that the valve thermostat 33 will cycle off the contact 128 of relay A for the temperature range of 5° throughout the cooling cycle of the system and that the cycling operation of the damper control thermostat and relay A will effect an adjustment of damper 28 so as to deliver the maximum supply of fresh air to the chamber 21 which will be consistent with maintaining the desired temperature within the space 11 of the bus.

If and when the temperature of the bus falls below the adjusted functional setting of thermostat 33, this thermostat will open at its upper contact and, therefore, deenergize heat valve relay C. The opening of contact 99 of relay C, as previously described, results in opening the valve 37 to deliver heat to the heater 24 and thereby add some heat to the previously cooled air.

In order to avoid reheating of the previously cooled air for an undue length of time a visual signal 46 is connected through the upper and lower contacts of a signal thermostat 132. This circuit leads from the main line 49 through wire 133, energized closed contact 117 of cooling cycle relay B, leads 134 and 135 through the upper and lower contacts 136 and 137, when the thermostat 132 is closed, through the visual signal 46 to the ground. The signal 46, as herein indicated, is illustrated as an electric light, but it can be obviously any form of signal including an audible signal, if desired. The electric light 46 is flashed on and off by the opening and closing of the thermostat 132 which is here utilized as an electric switch. The operating circuit for the electric switch leads from the closed contact 117 of cooling cycle relay B through leads 134, 138, deenergized closed contact 139 of valve relay C, lead 140, buffer resistor 141 through an electrical heater 142 and thence through lead 143 to the ground.

When the driver of the bus observes the operation of signal 46 he will open the switch 44 so as to deenergize the cooling mechanism and the cooling cycle relay.

It is normally desirable to maintain less cooling of the bus during the night season than during the day. Consequently when the light switch 45 is closed, during the operation of the cooling mechanism, the relay D is energized to open its contact 123 and thereby connects the resistors 121 and 121ª in series so as to reduce the amount of heating current to the auxiliary heater 48. This reduction of auxiliary heat to heater 48 raises the temperature setting of thermostat 33.

We claim:

1. In temperature and ventilation control apparatus, the combination with a blower for delivering a stream of air into an enclosure, air heating element arranged in heat exchange relation with the air stream for altering the temperature thereof; means for delivering a mixture of outside and inside air to the blower including a duct leading to the blower from the outside and the inside of said enclosure and an adjustable damper associated with said duct for controlling the proportions of outside and inside air delivered; of means for controlling the activation of the air heating element comprising a de-energized open electrical valve for delivering heating medium to said air heater, a heat control relay having energized and de-energized closed contacts, circuit means connected through an energized closed first contact of said heat control relay for energizing said valve closed, and circuit means including a heat control thermostat having a predetermined temperature setting and responsive to the temperature of the enclosure for controlling the energization of said heat control relay; means for automatically adjusting said damper comprising a reversible motor operatively connected thereto and operable in one direction to impart adjusting movements to the damper to increase the amount of outside air and decrease the amount of inside air delivered and operable in the opposite direction to impart adjusting movements to the damper to decrease the amount of outside air and increase the amount of inside air delivered, a damper control relay provided with energized and de-energized contacts, circuit means connected through an energized closed first contact of the damper control relay for closing a circuit to operate the damper motor in the first mentioned direction to increase the amount of outside air delivered, a second circuit means connected through a deenergized closed second contact of said damper control relay to close the second mentioned circuit through the damper motor to decrease the amount of outside air and increase the amount of inside air delivered, and circuit means including a thermostat having a predetermined temperature setting corresponding to the said setting of the first mentioned thermostat and responsive to the temperature of the enclosure for energizing said damper relay; means for sub-calibrating both of said thermostats to produce cycling thereof and to effect a lag in the closing of the heat control thermostat relative to the closing of the damper control thermostat so as to impart movements to the damper to increase the amount of outside air preliminary to the cycling of the heat control thermostat and consequent recurrent closing and opening of the heat valve comprising electrical heaters for applying auxiliary heat to the thermostats, circuit means consisting of a first branch connected through a de-energized second contact of the heat control relay to direct a predetermined amount of heating current to the heater of the heat control thermostat to adjust it to a lower temperature setting, and circuit means consisting of a first and second branch for directing sufficient heating current to the heater of the damper control thermostat to adjust its temperature setting below the adjusted setting of the heat control thermostat; and circuit means comprising a third branch and connected through an energized closed third contact of the heat control relay for directing additional heating current to the heater of the damper control thermostat to create a lag in the opening of the damper control thermostat relative to the opening of the heat control thermostat when the latter has functioned and thereby effect adjustments of the damper to increase the amount of outside air delivered.

2. The combination structure defined in claim 1 characterized by the provision of an air cooler arranged in heat exchange relation with the air stream delivered into the enclosure, means for activating the air cooler, a cooling cycle relay connected in parallel with the cooler activating means and energized simultaneously therewith and provided with de-energized first and second contacts cooperating with said energized first and de-energized second contacts of the damper control relay and provided also with energized third and fourth contacts cooperating upon closing thereof with a de-energized closed third contact and an energized fourth contact, respectively, of the damper relay to reverse the circuit connections through the damper motor, whereby the closing of the damper thermostat and consequent energization of the damper control relay energizes the damper motor to move the damper in a direction to reduce the amount of outside air and increase the amount of inside air delivered to the blower and whereby opening of the damper control thermostat and consequent de-energization of the damper control relay closes a circuit through the damper motor to move the damper in a direction to increase the delivery of outside air, de-energized fifth and sixth contacts of the cooling cycle relay interposed in the said second and third circuit branches for supplying heating current to the heater of the damper control thermostat, whereby the last mentioned circuits are opened upon energization of the cooling cycle relay to raise the previous temperature adjustment of the damper control thermostat, second and third circuit branches for supplying additional heating current to the heater of the heat control thermostat to reduce its temperature setting below the last adjusted setting of the damper control thermostat, whereby the opening of the heat control thermostat lags in relation to the opening of the damper control thermostat.

3. A combination structure as defined in claim 2 characterized by the provision of a plurality of metering resistors connected in the said second branch of the heating circuit for the heater of the damper control thermostat, a plurality of metering resistors interposed in the second branch of the heating circuit for the heater of the heat control thermostat, and a variable resistor for adjusting the resistance of both said second branches to increase and decrease the heating effect of the thermostat heaters.

4. The combination structure defined in claim 3 characterized by the provision of a pair of shunt circuits for by-passing electrical current around a resistor in each of said second circuit branches and manually control means for opening and closing said shunt circuits.

TIMOTHY J. LEHANE.
WILLIAM M. SMITH.

References Cited in the file of this patent

UNITED STATES PATENTS

| Number | Name | Date |
|---|---|---|
| 2,209,787 | Miller | July 30, 1940 |
| 2,315,517 | Greenlee et al. | Apr. 6, 1943 |
| 2,323,236 | Parks et al. | June 29, 1943 |
| 2,522,287 | Lehane et al. | Sept. 12, 1950 |
| 2,534,174 | Lehane et al. | Dec. 12, 1950 |

FOREIGN PATENTS

| Number | Country | Date |
|---|---|---|
| 587,060 | Great Britain | Apr. 11, 1947 |